US012780604B2

(12) United States Patent
Miriyala

(10) Patent No.: US 12,780,604 B2
(45) Date of Patent: Nov. 3, 2026

(54) SYSTEM AND METHOD FOR DETERMINING A TRAVEL INTENT OF AN ELEVATOR PASSENGER AND PROVIDING RESPONSIVE ALERTS

(71) Applicant: OTIS ELEVATOR COMPANY, Farmington, CT (US)

(72) Inventor: Pradeep Miriyala, Hyderabad Telangana (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 536 days.

(21) Appl. No.: 18/481,491

(22) Filed: Oct. 5, 2023

(65) Prior Publication Data

US 2025/0115461 A1 Apr. 10, 2025

(51) Int. Cl.

| | |
|---|---|
| ***B66B 5/02*** | (2006.01) |
| ***B66B 3/00*** | (2006.01) |
| ***G06N 5/022*** | (2023.01) |

(52) U.S. Cl.

CPC .............. *B66B 5/025* (2013.01); *B66B 3/002* (2013.01); *G06N 5/022* (2013.01); *B66B 2201/4684* (2013.01)

(58) Field of Classification Search

CPC ....... B66B 5/0012; B66B 5/025; B66B 3/002; B66B 5/021; B66B 2201/4684; G06N 5/022

USPC .......................................................... 187/381

See application file for complete search history.

(56) References Cited

U.S. PATENT DOCUMENTS

| | | | | |
|---|---|---|---|---|
| 4,839,631 | A | 6/1989 | Tsuji | |
| 10,055,657 | B2 | 8/2018 | Fang et al. | |
| 10,095,315 | B2 | 10/2018 | Amores-Llopis et al. | |
| 10,241,486 | B2 | 3/2019 | Finn et al. | |
| 11,021,344 | B2 | 6/2021 | Finn et al. | |
| 11,472,662 | B2 * | 10/2022 | Adifon .................... | B66B 1/468 |
| 11,498,802 | B2 | 11/2022 | Marvin et al. | |
| 2008/0169929 | A1 * | 7/2008 | Albertson ................ | G01V 5/20 340/573.1 |
| 2022/0242693 | A1 * | 8/2022 | Saleh ....................... | A61B 5/01 |

FOREIGN PATENT DOCUMENTS

| | | | |
|---|---|---|---|
| CN | 101221621 | B | 6/2013 |
| EP | 3285160 | A1 | 2/2018 |
| EP | 3421401 | B1 | 4/2021 |
| WO | 2006114956 | A1 | 11/2006 |

OTHER PUBLICATIONS

Chen (CN 107902503 A), Calling Elevator of Method, Device, Equipment and Storage Medium (Year: 2018).*

(Continued)

*Primary Examiner* — Jorge L Carrasquillo

(74) *Attorney, Agent, or Firm* — CANTOR COLBURN LLP

(57) ABSTRACT

An elevator system having an elevator car; at least one sensor, wherein, the system is configured to: receive sensor data from the at least one sensor that is indicative of a first passenger calling or within the elevator car; determine from the at least one sensor data a travel intent of the first passenger; and take an action when the travel intent triggers an alert condition.

26 Claims, 4 Drawing Sheets

(56) References Cited

OTHER PUBLICATIONS

Mabuchi (WO 2006114956 A1) Crime Preventive Operation System of Elevator (Year: 2006).*
Yao et al. (CN 114890261 A) PLC-based Elevator Waiting Control Method (Year: 2022).*
European Search Report for application EP 24204127.5, Issued Feb. 24, 2025 in U321973EP, 9 pages.

* cited by examiner

SYSTEM AND METHOD FOR DETERMINING A TRAVEL INTENT OF AN ELEVATOR PASSENGER AND PROVIDING RESPONSIVE ALERTS

BACKGROUND

The embodiments are directed to elevator systems and more specifically to a system and method for determining a travel intent of an elevator passenger and providing responsive alerts.

It is possible that a person with questionable motives uses elevators more frequently than other users. For instance, a burglar may use an elevator to steal items from a passenger that is traveling alone. For periods of time, the burglar may appear to have no purpose taking an elevator though they may take the elevator frequently. Controlling elevators to minimize associated risks to passengers is desirable.

BRIEF SUMMARY

Disclosed is an elevator system including an elevator car; at least one sensor, wherein, the system is configured to: receive sensor data from the at least one sensor that is indicative of a first passenger calling or within the elevator car; determine from the at least one sensor data a travel intent of the first passenger; and take an action when the travel intent triggers an alert condition.

In addition to one or more aspects of the system or as an alternate, to take the action, the system is configured to issue an alert or assign the first passenger to ride alone or with multiple people.

In addition to one or more aspects of the system or as an alternate, to determine the travel intent of the first passenger, the system is configured to: processing, as training data, a time series model of a history of elevator calls and travel intents for the first passenger by one or more artificial intelligence (AI) models to thereafter identify the first passenger and the travel intent of the first passenger.

In addition to one or more aspects of the system or as an alternate, the one or more AI models includes: a user recognition model; and an intent recognition model.

In addition to one or more aspects of the system or as an alternate, upon triggering the alert condition, the system is configured to execute supervised learning by soliciting feedback to confirm an accuracy of categorizing of the travel intent as an anomaly, and applying the feedback to the one or more artificial intelligence (AI) models.

In addition to one or more aspects of the system or as an alternate, the time series model identifies, for a plurality of passengers including the first passenger, a unique passenger identifier and a history of elevator calls and travel intents for each of the plurality of passengers.

In addition to one or more aspects of the system or as an alternate, the system is configured to determine the travel intent for the first passenger for a call by feeding call data to the one or more artificial intelligence (AI) models, wherein, for the first passenger, the call data includes one or more of: call time; call floor; request destination floor; observed destination floor; worn attire; carried gear; and a number of people traveling with the first passenger.

In addition to one or more aspects of the system or as an alternate, when determining whether the travel intent for the first passenger triggers the alert condition, the system is configured to: compare the travel intent of the first passenger with the time series model to determine whether to categorize the travel intent as an anomaly for the first passenger; and determine whether the anomaly for the first passenger triggers the alert condition.

In addition to one or more aspects of the system or as an alternate, the system is configured to trigger the alert condition upon determining a total number of anomalies for the first passenger exceeds a threshold.

In addition to one or more aspects of the system or as an alternate, upon triggering the alert condition, the system is configured to issue one or more of: a user isolation flag such that the system will thereafter only service the first passenger when not serving other passengers; a multiple-person flag such that the system will thereafter only service the first passenger when at least two other passengers are already on-board the elevator car; or a denial of service flag such that the system will thereafter not service the first passenger.

Disclosed is a method of operating an elevator system, including: receiving sensor data from at least one sensor, where the sensor data is indicative of a first passenger calling or within the elevator car; determining from the sensor data a travel intent of the first passenger; and taking an action when the travel intent triggers an alert condition.

In addition to one or more aspects of the method or as an alternate, when taking the action, the method includes issuing an alert or assigning the first passenger to ride alone or with multiple people.

In addition to one or more aspects of the method or as an alternate, when determining the travel intent of the first passenger, the method includes: processing as training data, by the system, a time series model of a history of elevator calls and travel intents for the first passenger by one or more artificial intelligence (AI) models to thereafter identify the first passenger and the travel intent of the first passenger.

In addition to one or more aspects of the method or as an alternate, the one or more AI models includes: a user recognition model; and an intent recognition model.

In addition to one or more aspects of the method or as an alternate, upon triggering the alert condition, the method includes executing, by the system, supervised learning by soliciting feedback to confirm an accuracy of categorizing of the travel intent as an anomaly, and applying the feedback to the one or more artificial intelligence (AI) models.

In addition to one or more aspects of the method or as an alternate, the time series model identifies, for a plurality of passengers including the first passenger, a unique passenger identifier and a history of elevator calls and travel intents for each of the plurality of passengers.

In addition to one or more aspects of the method or as an alternate, the method includes determining, by the system, the travel intent for the first passenger for a call by feeding call data to the one or more artificial intelligence (AI) models, wherein, for the first passenger, the call data includes one or more of: call time; call floor; request destination floor; observed destination floor; worn attire; carried gear; and a number of people traveling with the first passenger.

In addition to one or more aspects of the method or as an alternate, when determining whether the travel intent for the first passenger triggers the alert condition, the method includes: comparing, by the system, the travel intent of the first passenger with the time series model to determine whether to categorize the travel intent as an anomaly for the first passenger; and determining whether the anomaly for the first passenger triggers the alert condition.

In addition to one or more aspects of the method or as an alternate, the method includes triggering, by the system, the alert condition upon determining a total number of anomalies for the first passenger exceeds a threshold.

In addition to one or more aspects of the method or as an alternate, upon triggering the alert condition, the method include issuing, by the system, one or more of: a user isolation flag such that the system will thereafter only service the first passenger when not serving other passengers; a multiple-person flag such that the system will thereafter only service the first passenger when at least two other passengers are already on-board the elevator car; or a denial of service flag such that the system will thereafter not service the first passenger.

BRIEF DESCRIPTION OF THE DRAWINGS

The present disclosure is illustrated by way of example and not limited in the accompanying figures in which like reference numerals indicate similar elements.

DETAILED DESCRIPTION

A detailed description of one or more embodiments of the disclosed apparatus and method are presented herein by way of exemplification and not limitation with reference to the Figures.

Figure 1:
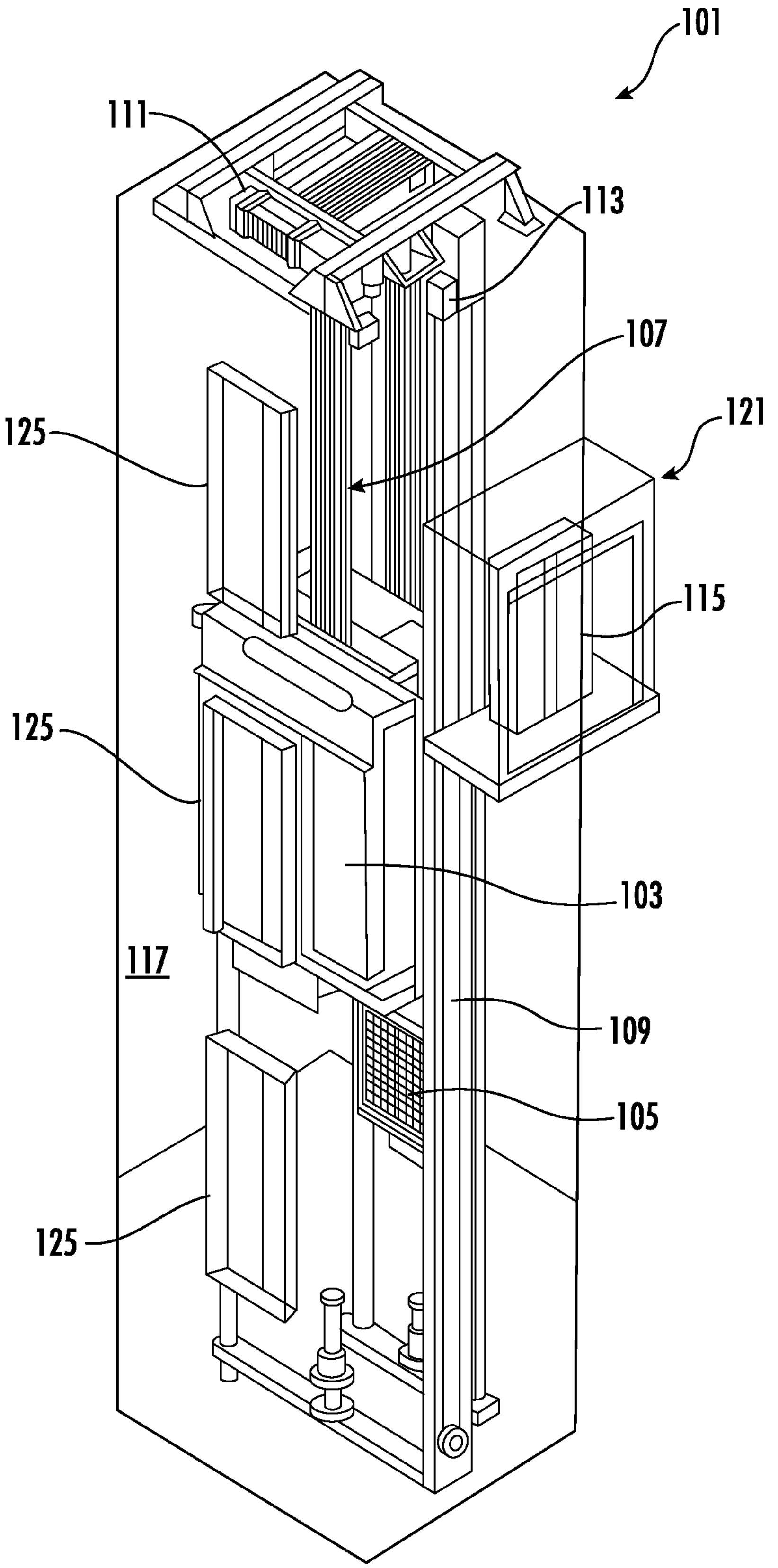
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail (or rail system) 109, a machine (or machine system) 111, a position reference system 113, and an electronic elevator controller (controller) 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft (or hoistway) 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. Embodiments may also be employed in ropeless elevator systems using self-propelled elevator cars (e.g., elevator cars equipped with friction wheels, pinch wheels or traction wheels). FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1.

Figure 2:
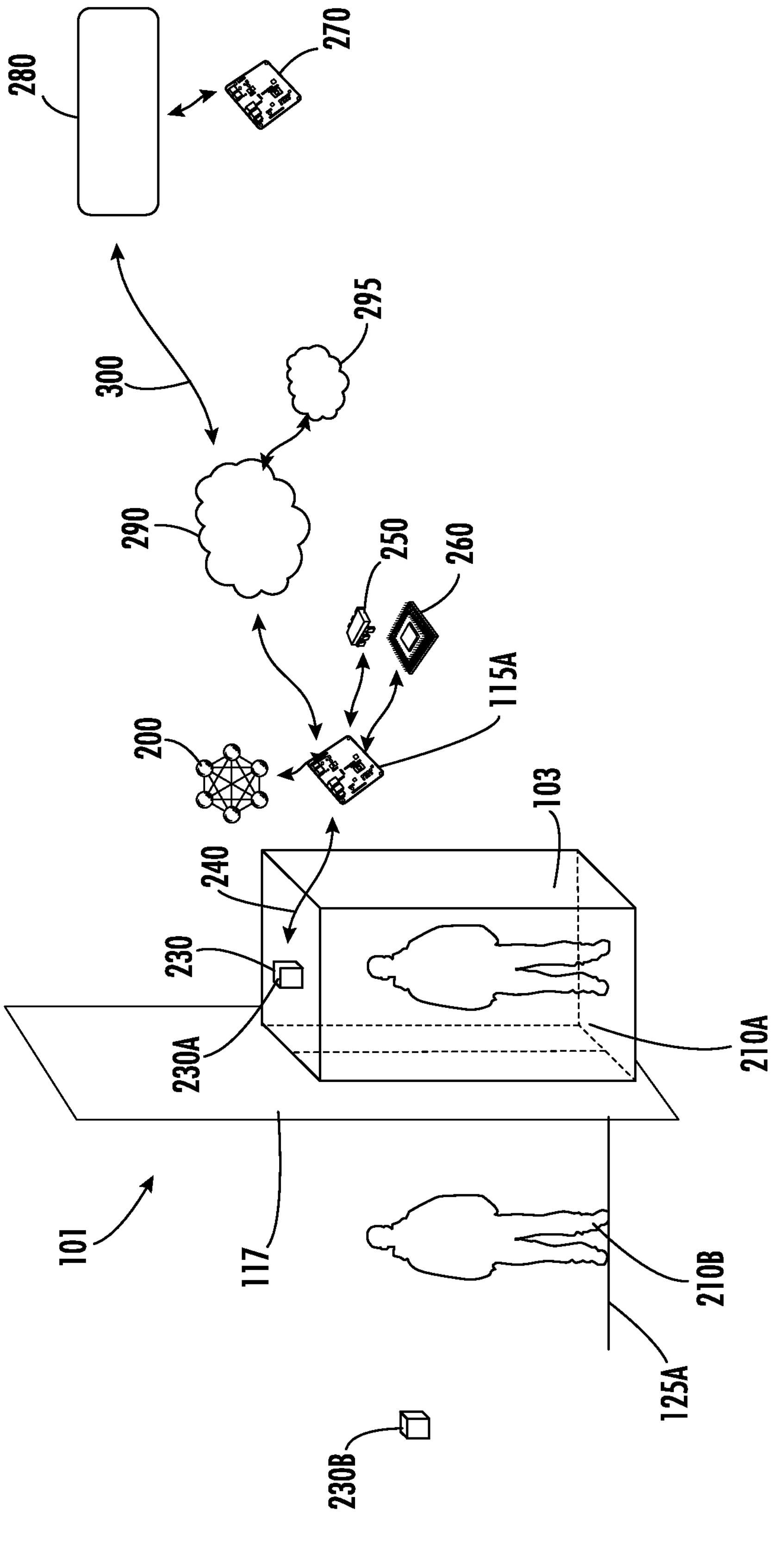
FIG. 2, shows additional details of the system for detecting a passenger intent and providing alerts.

Turning to FIG. 2, additional details are disclosed of the system 101 for detecting a passenger intent and providing alerts. The system 101 includes the elevator car 103 and controller 115A, which may be the same as or different from the controller 115 of FIG. 1, operationally coupled to the elevator car 103. A sensor, generally referenced as 230, is operationally coupled to the controller 115A and configured to transmit sensor data 240 to the controller 115A. The sensor 230 may include an imaging technology, a non-limiting example of which includes one or more cameras 230A, 230B located in one or more of an elevator lobby 125A and within the elevator car 103. Other imaging technologies may be used for the sensor 230. Alternatively the sensor 230 may be configured to detect a person's electrical device, such a mobile phone, as a proxy for the person. The sensor 230 may communicate via wired protocols, or wireless protocols over a wireless network 290, with the controller 115A. The sensor 230 and controller 115A may communicate via a cloud service 295. Processing as discussed below may be performed via edge computing on either of the sensor 230 or controller 115A, or on the cloud 295. Portions of the processing may be performed separately, and the resulting data may be stitched together, e.g., by the controller 115A, for rendering determinations identified below. For example, the controller 115A may have non-transitory memory 250 that holds a program 200 configured to perform processing as discussed below and a processor 260 that executes the program.

As discussed in greater detail below, in the disclosed embodiments, each passenger, generally referenced as 210, including a first passenger 210A in the elevator car 103 and the second passenger 210B in the lobby 125A, is tagged when they use the elevator car 103. The tagging may be performed using combination of the car and lobby cameras 230 or other sensor implements as indicated above. An artificial intelligence (AI) program 200, executing a deep learning algorithm, analyzes the travel intent by information collected from video footage, e.g., a passenger 210 may be using elevator car 103 when traveling to a gym, office etc. The recognized travel intent is also characterized or tagged for the passenger 210. An anomaly occurs if there appears to be no purpose for using the elevator car 103 or the purpose is undetected for a passenger 210, as explained further, below.

When a threshold number of anomalies occurs for a passenger 210, the system 101 determines that an alert condition has occurred. Future elevator trips for the passenger 210 will be assigned such that the number of people inside elevator car 103 will be singular or multiple. For example, a person with a greater number of anomalies may be assigned to ride alone as compared with a person with a fewer number of anomalies who may be assigned to ride with multiple people. Alternatively, an anomaly type may control a determination of whether a person should be assigned to ride alone or with multiple people. That is, the perceived risk level associated with the person due to their observed frequency and type of anomalies may control the decision on the type of exposure the person may have to others in an elevator car 103. It is to be appreciated that, depending on the detected anomalies, alone or with other factors such as time of day, the system may determine to not service the passenger 210, either at that time, for a period of time, or until otherwise instructed by the elevator service center 280. If future rides for the passenger 210 are designated as singular, then not more than the passenger 210 can ride in the elevator car 103 with that passenger. If future rides for the passenger 210 are designated as multiple, then multiple people (e.g. 3 people) should be in the car before the passenger 210 can ride the elevator car 103.

The alert condition is also optionally reported to building administrator station 280, which can be stored on a server 270 and reviewed in real time, or played back at a subsequent time, so that necessary actions may be taken. The program 200 may receive feedback from the building administrator station 280 that identifies false detections of anomalies to improve itself, e.g., applying an AI supervised learning technique.

Figure 3:
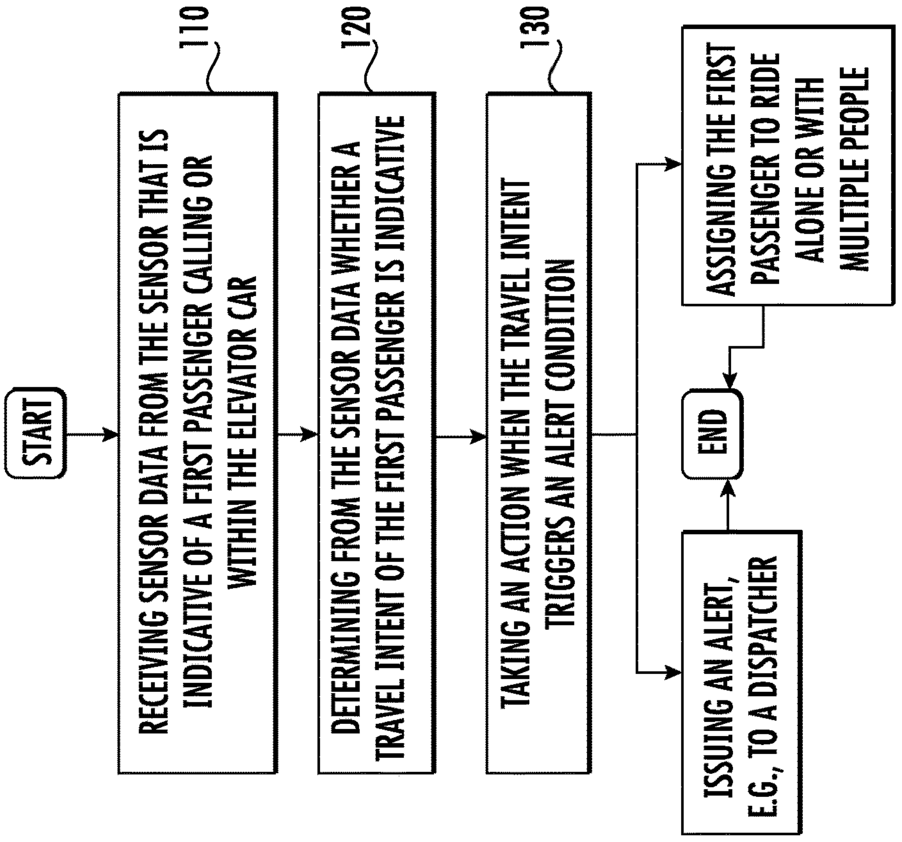
FIG. 3 is a flowchart showing a method of detecting a travel intent of the passenger.

Turning to FIG. 3, a flowchart shows details of a method of detecting a travel intent of the first passenger 210A. As shown in block 110 the system 101 is configured for receiving sensor data 240 from the sensor 230 that is indicative of the first passenger 210A calling from the lobby 125A or within the elevator car 103. As shown in block 120, the system 101 is configured for determining from the sensor data 240 a travel intent of the first passenger 210A. As shown in block 130, the system 101 is configured for taking an action when the travel intent triggers an alert condition. This could include issuing an alert, e.g., to a dispatcher (block 132), or assigning the first passenger to ride alone or with multiple people (block 134).

Figure 4:
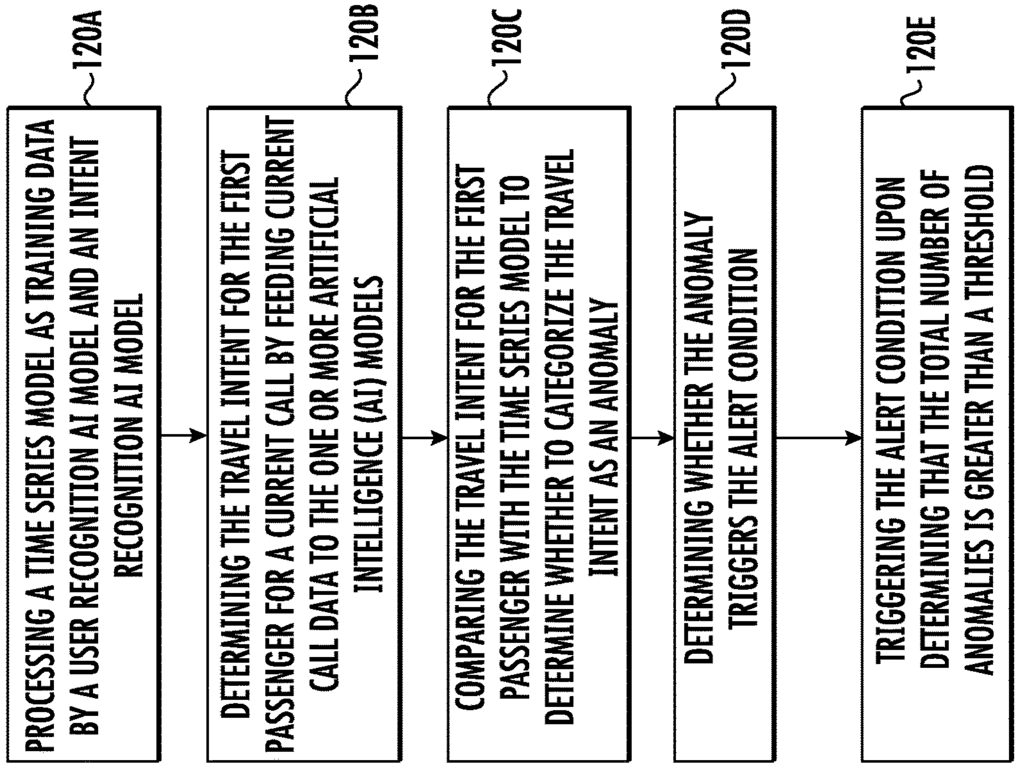
FIG. 4 is a flowchart showing additional details of determining a travel intent of the passenger.

Turning to FIG. 4, a flowchart shows additional details of determining a travel intent of the first passenger 210A (block 120). As shown in block 120A, the system 101 is configured for processing, by the program 200, a time series model for the first passenger 210A as training data, to thereafter identify the first passenger 210A and the travel intent of the first passenger 210A. For simplicity, such model is equivalent to a list of entries such in table 1.

TABLE 1

| Passenger | Time of Elevator Usage | Intent of Travel |
|---|---|---|
| A | 8:00 AM | Office Entry |
| B | 7:00 AM | Jog |
| A | 12:00 PM | Lunch |
| B | 8:00 AM | Return to Home |
| B | 8:02 AM | Exit *1 |
| B | 8:10 AM | Reentry *2 |
| B | 9:30 AM | Walk |
| B | 9:35 AM | Return to Home |
| B | 9:50 AM | Walk |
| B | 9:55 AM | Return to Home |
| B | 10:10 AM | Roam |
| B | 10:15 AM | Return to Home *3 |
| B | 3:00 PM | Shop |
| A | 5:00 PM | Office Exit |

The time series model identifies, e.g., a unique passenger identifier assigned to the passengers 210 (e.g., passengers A or passengers B), a past travel time of each past elevator call by the passengers 210, and a past travel intent for each past elevator call by the passengers 120.

At each elevator usage of the passengers 210, an intent is tagged. An intent may be inferred from various factors including call time, call floor, requested destination floor, observed destination (offboarding) floor, worn attire, carried gear, and a number of people traveling with the passengers 210. For example, if the passenger 210 is wearing running attire and is exiting the elevator car 103 on a main lobby 125A, it can be inferred that the passenger 210 is going for a jog. It is to be appreciated that the intent field in the training data (table 1) may be manually entered for each passenger. Thus, a history of passenger-intent-time may be built for each passenger 210.

For training purposes, anomalies in the time series model may be manually identified from information in the training data. For example, table 1 lists activities for two passengers 210 including the first passenger 210A (or A) and a second passenger 210B (or B). At line entry *1, the entry may be initially categorized or tagged as an anomaly because the second passenger 210B appears to have exited the elevator car 103 within two minutes of entry. At line entry *2, based on a quick subsequent reentry, it may be inferred that the line entry *1 is not an anomaly. That is, the reentry may be due to the second passenger 210B forgetting items while coming back from a jog. At line entry *3, the intent may be categorized as an anomaly due to repeated short usages or calls of the elevator car 103. For example, within span of 45 mins, i.e., between 9:30 AM and 10:15 AM, the second passenger 210B registered six usages, including three round trips each spanning five minutes in a gap of fifteen minutes. Thus, the training data (table 1) may be used to teach the system 101 to detect when a passenger 210 has acted in such a way as to be categorized as an anomaly, which may lead to an alert condition. This is because the behavior of the second passenger 210B may be indicative of questionable acts, including, e.g., following other passengers 210. Below is a further discussion regarding how the system may be trained to identify an expected or anticipated intent of a passenger and thereby identify an anomaly, i.e., an action that differs from the expected or anticipated intent.

The time series model may be processed by one or more artificial intelligence (AI) models. For example, the time series data can be analyzed by a time series machine learning algorithms to detect the anomalies. Such models may be trained based on expected patterns of intent-with-time-stamps to identify any anomalies. In one embodiment, the model workflow may include preparing training data with intent-history data of passengers/users of building. Each tagged unique passenger will have one associated series of data. Each intent is converted to a number from the text utilizing a known machine learning (ML) technique for transforming category data. The data may be labelled manually, or using unsupervised learning to detect clusters of data, to flag if anomaly is present or not. A time series model (table 1) can be then used to train a ML model. The ML model can then be made operational by deploying in a real-world scenario.

In one embodiment, the AI models that process the time series model include a user recognition model and an intent recognition model. A user recognition model is an ML model that can identify the user (e.g., a passenger 210) of the system 101 based on their behavior or characteristics. For example, a user recognition model can use the data from the sensors 230 to recognize the user based on their body movements and daily activities. An intent recognition model uses ML to associate expression to a given intent. This technique is also known as intent classification. The process involves providing examples of text alongside intents, e.g., table 1, to an ML model. The ML model is then trained on the data (table 1) and can operate based on the data to identify the intent of users.

For example, the traffic lists for a single passenger may be combined over time, with time as a parameter, using Bayesian Inference for a probabilistic prediction of the passenger's intended destination. Such a system could learn that passenger A always goes to Floor N early in the morning, typically to Floor C (the cafeteria) at noon, and always goes to the Parking Garage in the late afternoon.

Further, the traffic lists for multiple passengers can be combined over time, with time as a parameter, again using Bayesian Inference. Such a system facilitates statistical distribution determination of elevator usage for the entire building during a typical day as well as weekend days, holidays, etc. This information could be used to pre-assign cars to runs (even purposefully skipping floors), for efficient parking, dispatching cars, etc.

Given the information of the traffic lists, the elevator optimization is achieved by techniques for real-time solution of an optimization problem. The traffic lists information can also be utilized for other elevator elated applications such as elevator daily load estimation to provide one accurate energy report for future energy saving, elevator system diagnostics based on abnormal traffic list information, modernization value propositions, and so on.

More specifically, using camera-based systems, a passenger can be detected. The system may be trained to detect if the passenger is traveling alone or with a group. The group type can further be classified as children, couples, friends, colleagues etc. The system may be trained to detect if the passenger (and group) has any luggage. With a degree of confidence, general profiles may be built that fit categories such as professional purposes, leisure purposes, personal purposes, health purposes, etc. The system may be trained to profile passenger, which helps to improve how to optimally identify purpose of visit. For instance, video imagery of a professional visit of a sports person will differ from a professional visit of a businessperson. The system may then map learned features from a video (e.g., attire, luggage, single or group travel, etc.) with a type of building installation to improve confidence in identifying purpose of visit. This training process results in identifying, with a degree of confidence, an intent of a passenger that rides the elevator car.

Turning back to FIG. 4, as shown in block 120B, the system is configured for determining a travel intent for the first passenger 210A for a call by feeding call data to the one or more AI models. The call data includes one or more of boarding time for the first passenger A, boarding floor for the first passenger 210A, destination floor requested by the first passenger 210A, an observed destination (offboarding) floor for the first passenger 210A, attire worn by the first passenger 210A, gear carried by the first passenger 210A, and a number of people traveling with the first passenger. If the call data is outside of an expected range for the first passenger 210A, then an anomaly is identified. For example, if the first passenger 210A normally travels between the first and tenth floors, and then randomly travels repeatedly between the second and third floors, the travel intent could be categorized as an anomaly. If they normally wear a suit and travel during business hours, and then randomly travel during late night hours wearing a dark outfit that is not business attire, the travel intent could be categorized as an anomaly. If they normally travel alone during business hours and are randomly traveling with another person during off hours, the travel intent could be categorized as an anomaly.

As shown in block 120C, when determining whether the travel intent of the first passenger 210A triggers an alert condition, the system 101 is configured for comparing the travel intent for the first passenger 210A with the time series model (FIG. 1), which served as the training data, e.g., to determine if there is an anomaly. As shown in block 120D, the system 101 is configured for determining whether to categorize the travel intent as an anomaly if the system 101 cannot identify the travel intent based on the training data. As shown in block 120F, the system 101 is configured for triggering the alert condition upon determining that the total number of anomalies for the first passenger 210A is greater than a threshold.

Figure 5:
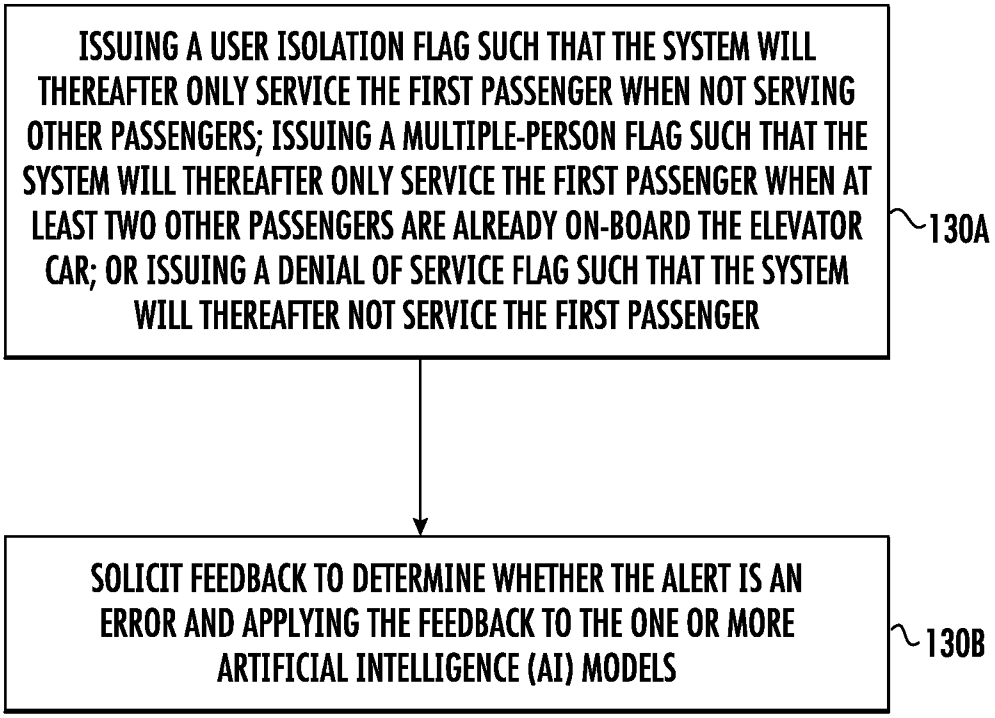
FIG. 5 is a flowchart showing additional details of issuing the alert when the travel intent of the passenger triggers the alert condition.

Turning to FIG. 5, a flowchart shows additional details of issuing the alert when the travel intent of the first passenger triggers the alert condition (block 120). As shown in block 130A, upon triggering the alert condition, the system 101 is configured for issuing a user isolation flag to the service center 280 such that the system 101 will thereafter only service the first passenger 210A when not serving other passengers 210. Alternatively, the system 101 is configured for issuing a multiple-person flag such that the system 101 will thereafter only service the first passenger 210A when at least two other passengers 210 are already on-board the elevator car 103. Alternatively, the system 101 is configured for issuing a denial-of-service flag such that the system 101 will thereafter not service the first passenger 210A.

As shown in block 130B, upon triggering the alert condition, the system 101 is configured for performing a supervised learning technique. That is, the system 101 is configured for soliciting feedback from the dispatcher at the service center 280 to determine whether the anomaly categorizations are an error and applying the feedback to the one or more artificial intelligence (AI) models, i.e., to the program 20.

In the above embodiments, sensor data may be obtained and processed separately, or simultaneously and stitched together, or a combination thereof, and may be processed in a raw or complied form. The sensor data may be processed on the sensor (e.g. via edge computing), by controllers identified or implicated herein, on a cloud service, or by a combination of one or more of these computing systems. The senor may communicate the data via wired or wireless transmission lines, applying one or more protocols as indicated below.

Wireless connections may apply protocols that include local area network (LAN, or WLAN for wireless LAN) protocols. LAN protocols include WiFi technology, based on the Section 802.11 standards from the Institute of Electrical and Electronics Engineers (IEEE). Other applicable protocols include Low Power WAN (LPWAN), which is a wireless wide area network (WAN) designed to allow long-range communications at a low bit rates, to enable end devices to operate for extended periods of time (years) using battery power. Long Range WAN (LoRaWAN) is one type of LPWAN maintained by the LoRa Alliance, and is a media access control (MAC) layer protocol for transferring management and application messages between a network server and application server, respectively. LAN and WAN protocols may be generally considered TCP/IP protocols (transmission control protocol/Internet protocol), used to govern the connection of computer systems to the Internet. Wireless connections may also apply protocols that include private area network (PAN) protocols. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols also include Zigbee, a technology based on Section 802.15.4 protocols from the IEEE, representing a suite of high-level communication protocols used to create personal area networks with small, low-power digital radios for low-power low-bandwidth needs. Such protocols also include Z-Wave, which is a wireless communications protocol supported by the Z-Wave Alliance that uses a mesh network, applying low-energy radio waves to communicate between devices such as appliances, allowing for wireless control of the same.

Wireless connections may also include radio-frequency identification (RFID) technology, used for communicating with an integrated chip (IC), e.g., on an RFID smartcard. In addition, Sub-1 Ghz RF equipment operates in the ISM (industrial, scientific and medical) spectrum bands below Sub 1 Ghz—typically in the 769-935 MHz, 315 Mhz and the 468 Mhz frequency range. This spectrum band below 1 Ghz is particularly useful for RF IOT (internet of things) applications. The Internet of things (IoT) describes the network of physical objects—"things"—that are embedded with sensors, software, and other technologies for the purpose of connecting and exchanging data with other devices and systems over the Internet. Other LPWAN-IOT technologies include narrowband internet of things (NB-IOT) and Category M1 internet of things (Cat M1-IOT). Wireless communications for the disclosed systems may include cellular, e.g. 2G/3G/4G (etc.). Other wireless platforms based on RFID technologies include Near-Field-Communication (NFC), which is a set of communication protocols for low-speed communications, e.g., to exchange date between electronic devices over a short distance. NFC standards are defined by the ISO/IEC (defined below), the NFC Forum and the GSMA (Global System for Mobile Communications) group. The above is not intended on limiting the scope of applicable wireless technologies.

Wired connections may include connections (cables/interfaces) under RS (recommended standard)-422, also known as the TIA/EIA-422, which is a technical standard supported by the Telecommunications Industry Association (TIA) and which originated by the Electronic Industries Alliance (EIA) that specifies electrical characteristics of a digital signaling circuit. Wired connections may also include (cables/interfaces) under the RS-232 standard for serial communication transmission of data, which formally defines signals connecting between a DTE (data terminal equipment) such as a computer terminal, and a DCE (data circuit-terminating equipment or data communication equipment), such as a modem. Wired connections may also include connections under (cables/interfaces) the Modbus serial communications protocol, managed by the Modbus Organization. Modbus is a server/client protocol designed for use with its programmable logic controllers (PLCs) and which is a commonly available means of connecting industrial electronic devices. Wireless connections may also include connectors (cables/interfaces) under the PROFibus (Process Field Bus) standard managed by PROFIBUS & PROFINET International (PI). PROFibus which is a standard for fieldbus communication in automation technology, openly published as part of IEC (International Electrotechnical Commission) 61158. Wired communications may also be over a Controller Area Network (CAN) bus. A CAN is a vehicle bus standard that allow microcontrollers and devices to communicate with each other in applications without a host computer. CAN is a message-based protocol released by the International Organization for Standards (ISO). The above is not intended on limiting the scope of applicable wired technologies.

When data is transmitted over a network between end processors as identified herein, the data may be transmitted in raw form or may be processed in whole or part at any one of the end processors or an intermediate processor, e.g., at a cloud service (e.g. where at least a portion of the transmission path is wireless) or other processor. The data may be parsed at any one of the processors, partially or completely processed or complied, and may then be stitched together or maintained as separate packets of information. Each processor or controller identified herein may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory identified herein may be but is not limited to a random access memory (RAM), read only memory (ROM), or other electronic, optical, magnetic or any other computer readable medium.

The controller may further include, in addition to a processor and non-volatile memory, one or more input and/or output (I/O) device interface(s) that are communicatively coupled via an onboard (local) interface to communicate among other devices. The onboard interface may include, for example but not limited to, an onboard system bus, including a control bus (for inter-device communications), an address bus (for physical addressing) and a data bus (for transferring data). That is, the system bus may enable the electronic communications between the processor, memory and I/O connections. The I/O connections may also include wired connections and/or wireless connections identified herein. The onboard interface may have additional elements, which are omitted for simplicity, such as controllers, buffers (caches), drivers, repeaters, and receivers to enable electronic communications. The memory may execute programs, access data, or lookup charts, or a combination of each, in furtherance of its processing, all of which may be stored in advance or received during execution of its processes by other computing devices, e.g., via a cloud service or other network connection identified herein with other processors.

Embodiments can be in the form of processor-implemented processes and devices for practicing those processes, such as processor. Embodiments can also be in the form of computer code based modules, e.g., computer program code (e.g., computer program product) containing instructions embodied in tangible media (e.g., non-transitory computer readable medium), such as floppy diskettes, CD ROMs, hard drives, on processor registers as firmware, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes a device for practicing the exemplary embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, subcombinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system comprising:

an elevator car;

at least one sensor, wherein, the system is configured to:

receive sensor data from the at least one sensor that is indicative of a first passenger calling or within the elevator car;

determine from the at least one sensor data a travel intent of the first passenger; and take an action when the travel intent triggers an alert condition;

wherein:

to determine the travel intent of the first passenger, the system is configured to: process, as training data, a time series model of a history of elevator calls and travel intents for the first passenger by one or more artificial intelligence (AI) models to thereafter identify the first passenger and the travel intent of the first passenger;

the one or more AI models includes: a user recognition model; and an intent recognition model; and upon triggering the alert condition, the system is configured to execute supervised learning by soliciting feedback to confirm an accuracy of categorizing of the travel intent as an anomaly, and applying the feedback to the one or more artificial intelligence (AI) models.

2. The system of claim 1, wherein, to take the action, the system is configured to issue an alert or assign the first passenger to ride alone or with multiple people.

3. The system of claim 1, wherein:

the time series model identifies, for a plurality of passengers including the first passenger, a unique passenger identifier and a history of elevator calls and travel intents for each of the plurality of passengers.

4. The system of claim 3, wherein:

the system is configured to determine the travel intent for the first passenger for a call by feeding call data to the one or more artificial intelligence (AI) models, wherein, for the first passenger, the call data includes one or more of: call time; call floor; request destination floor; observed destination floor; worn attire; carried gear; and a number of people traveling with the first passenger.

5. The system of claim 4, wherein:

when determining whether the travel intent for the first passenger triggers the alert condition, the system is configured to:

compare the travel intent of the first passenger with the time series model to determine whether to categorize the travel intent as an anomaly for the first passenger; and determine whether the anomaly for the first passenger triggers the alert condition.

6. The system of claim 5, wherein:

the system is configured to trigger the alert condition upon determining a total number of anomalies for the first passenger exceeds a threshold.

7. The system of claim 6, wherein:

upon triggering the alert condition, the system is configured to issue one or more of:

a user isolation flag such that the system will thereafter only service the first passenger when not serving other passengers;

a multiple-person flag such that the system will thereafter only service the first passenger when at least two other passengers are already on-board the elevator car; or a denial of service flag such that the system will thereafter not service the first passenger.

8. A method of operating an elevator system, comprising:

receiving sensor data from at least one sensor, where the sensor data is indicative of a first passenger calling or within the elevator car;

determining from the sensor data a travel intent of the first passenger; and taking an action when the travel intent triggers an alert condition;

wherein:

when determining the travel intent of the first passenger, the method includes: processing as training data, by the system, a time series model of a history of elevator calls and travel intents for the first passenger by one or more artificial intelligence (AI) models to thereafter identify the first passenger and the travel intent of the first passenger;

the one or more AI models includes: a user recognition model; and an intent recognition model; and upon triggering the alert condition, the method includes executing, by the system, supervised learning by soliciting feedback to confirm an accuracy of categorizing of the travel intent as an anomaly, and applying the feedback to the one or more artificial intelligence (AI) models.

9. The method of claim 8, wherein, when taking the action, the method includes issuing an alert or assigning the first passenger to ride alone or with multiple people.

10. The method of claim 8, wherein:

the time series model identifies, for a plurality of passengers including the first passenger, a unique passenger identifier and a history of elevator calls and travel intents for each of the plurality of passengers.

11. The method of claim 10, including:

determining, by the system, the travel intent for the first passenger for a call by feeding call data to the one or more artificial intelligence (AI) models, wherein, for the first passenger, the call data includes one or more of: call time; call floor; request destination floor; observed destination floor; worn attire; carried gear; and a number of people traveling with the first passenger.

12. The method of claim 11, wherein:

when determining whether the travel intent for the first passenger triggers the alert condition, the method includes:

comparing, by the system, the travel intent of the first passenger with the time series model to determine whether to categorize the travel intent as an anomaly for the first passenger; and determining whether the anomaly for the first passenger triggers the alert condition.

13. The method of claim 12, including:

triggering, by the system, the alert condition upon determining a total number of anomalies for the first passenger exceeds a threshold.

14. The method of claim 13, wherein:

upon triggering the alert condition, the method include issuing, by the system, one or more of:

a user isolation flag such that the system will thereafter only service the first passenger when not serving other passengers; a multiple-person flag such that the system will thereafter only service the first passenger when at least two other passengers are already on-board the elevator car; or a denial of service flag such that the system will thereafter not service the first passenger.

15. An elevator system comprising:

an elevator car;

at least one sensor, wherein, the system is configured to:

receive sensor data from the at least one sensor that is indicative of a first passenger calling or within the elevator car;

determine from the at least one sensor data a travel intent of the first passenger; and take an action when the travel intent triggers an alert condition;

wherein:

to determine the travel intent of the first passenger, the system is configured to: process, as training data, a time series model of a history of elevator calls and travel intents for the first passenger by one or more artificial intelligence (AI) models to thereafter identify the first passenger and the travel intent of the first passenger;

the time series model identifies, for a plurality of passengers including the first passenger, a unique passenger identifier and a history of elevator calls and travel intents for each of the plurality of passengers;

the system is configured to determine the travel intent for the first passenger for a call by feeding call data to the one or more artificial intelligence (AI) models, wherein, for the first passenger, the call data includes one or more of: call time; call floor; request destination floor; observed destination floor; worn attire; carried gear; and a number of people traveling with the first passenger; and when determining whether the travel intent for the first passenger triggers the alert condition, the system is configured to: compare the travel intent of the first passenger with the time series model to determine whether to categorize the travel intent as an anomaly for the first passenger; and determine whether the anomaly for the first passenger triggers the alert condition.

16. The system of claim 15, wherein, to take the action, the system is configured to issue an alert or assign the first passenger to ride alone or with multiple people.

17. The system of claim 15, wherein the one or more AI models includes:

a user recognition model; and an intent recognition model.

18. The system of claim 17, wherein:

upon triggering the alert condition, the system is configured to execute supervised learning by soliciting feedback to confirm an accuracy of categorizing of the travel intent as an anomaly, and applying the feedback to the one or more artificial intelligence (AI) models.

19. The system of claim 15, wherein:

the system is configured to trigger the alert condition upon determining a total number of anomalies for the first passenger exceeds a threshold.

20. The system of claim 19, wherein:

upon triggering the alert condition, the system is configured to issue one or more of:

a user isolation flag such that the system will thereafter only service the first passenger when not serving other passengers;

a multiple-person flag such that the system will thereafter only service the first passenger when at least two other passengers are already on-board the elevator car; or a denial of service flag such that the system will thereafter not service the first passenger.

21. A method of operating an elevator system, comprising:

receiving sensor data from at least one sensor, where the sensor data is indicative of a first passenger calling or within the elevator car;

determining from the sensor data a travel intent of the first passenger; and taking an action when the travel intent triggers an alert condition;

wherein:

when determining the travel intent of the first passenger, the method includes: processing as training data, by the system, a time series model of a history of elevator calls and travel intents for the first passenger by one or more artificial intelligence (AI) models to thereafter identify the first passenger and the travel intent of the first passenger;

the time series model identifies, for a plurality of passengers including the first passenger, a unique passenger identifier and a history of elevator calls and travel intents for each of the plurality of passengers; and the method includes determining, by the system, the travel intent for the first passenger for a call by feeding call data to the one or more artificial intelligence (AI) models, wherein, for the first passenger, the call data includes one or more of: call time; call floor; request destination floor; observed destination floor; worn attire; carried gear; and a number of people traveling with the first passenger; and when determining whether the travel intent for the first passenger triggers the alert condition, the method includes: comparing, by the system, the travel intent of the first passenger with the time series model to determine whether to categorize the travel intent as an anomaly for the first passenger; and determining whether the anomaly for the first passenger triggers the alert condition.

22. The method of claim 21, wherein, when taking the action, the method includes issuing an alert or assigning the first passenger to ride alone or with multiple people.

23. The method of claim 21, wherein the one or more AI models includes:

a user recognition model; and an intent recognition model.

24. The method of claim 23, wherein:

upon triggering the alert condition, the method includes executing, by the system, supervised learning by soliciting feedback to confirm an accuracy of categorizing of the travel intent as an anomaly, and applying the feedback to the one or more artificial intelligence (AI) models.

25. The method of claim 21, including:

triggering, by the system, the alert condition upon determining a total number of anomalies for the first passenger exceeds a threshold.

26. The method of claim 25, wherein:

upon triggering the alert condition, the method include issuing, by the system, one or more of:

a user isolation flag such that the system will thereafter only service the first passenger when not serving other passengers; a multiple-person flag such that the system will thereafter only service the first passenger when at least two other passengers are already on-board the elevator car; or a denial of service flag such that the system will thereafter not service the first passenger.

* * * * *